US011943596B2

(12) United States Patent
Chen et al.

(10) Patent No.: US 11,943,596 B2
(45) Date of Patent: Mar. 26, 2024

(54) ACOUSTIC DEVICE

(71) Applicant: AAC Microtech (Changzhou) Co., Ltd., Changzhou (CN)

(72) Inventors: Weimin Chen, Shenzhen (CN); Kejia Liu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 139 days.

(21) Appl. No.: 17/749,148

(22) Filed: May 20, 2022

(65) Prior Publication Data

US 2023/0199397 A1 Jun. 22, 2023

(51) Int. Cl.

| | |
|---|---|
| ***H04R 9/04*** | (2006.01) |
| ***H01F 3/14*** | (2006.01) |
| ***H04R 7/16*** | (2006.01) |
| ***H04R 9/02*** | (2006.01) |
| *H01F 3/10* | (2006.01) |

(52) U.S. Cl.

CPC ............... *H04R 9/045* (2013.01); *H01F 3/14* (2013.01); *H04R 7/16* (2013.01); *H04R 9/025* (2013.01); *H01F 2003/103* (2013.01); *H04R 2400/11* (2013.01)

(58) Field of Classification Search

CPC .......... H04R 9/045; H04R 7/16; H04R 9/025; H04R 2400/11; H01F 3/14; H01F 2003/103

USPC .......................................................... 381/400

See application file for complete search history.

(56) References Cited

U.S. PATENT DOCUMENTS

| | | | | |
|---|---|---|---|---|
| 10,924,865 | B2 * | 2/2021 | Song | H04R 1/06 |
| 2011/0075880 | A1 * | 3/2011 | Kamimura | H04R 9/10 381/413 |
| 2013/0016874 | A1 * | 1/2013 | Huang | H04R 9/043 381/433 |
| 2013/0156237 | A1 * | 6/2013 | Kim | H04R 9/045 381/191 |
| 2014/0376766 | A1 * | 12/2014 | Chen | H04R 9/02 381/400 |
| 2018/0302724 | A1 * | 10/2018 | Li | H04R 1/06 |

* cited by examiner

*Primary Examiner* — Sean H Nguyen
(74) *Attorney, Agent, or Firm* — W&G Law Group

(57) ABSTRACT

The present invention provides an acoustic device including a frame, a vibration system and a magnetic circuit system. The vibration system includes a diaphragm, a voice coil, a voice coil holder connecting the diaphragm and the voice coil, and a support assembly connecting the frame and the voice coil holder. The voice coil holder comprises a first fixing portion extending toward a direction of the voice coil, a second fixing portion extending toward to the support assembly, and a first connecting portion connecting the first fixing portion and the second fixing portion. The first fixing portion is mounted to the voice coil, and the second fixing portion is mounted to the support assembly. The first connecting portion provides with a reinforcing rib protruding and extending from the first fixing portion.

10 Claims, 4 Drawing Sheets

ACOUSTIC DEVICE

FIELD OF THE PRESENT INVENTION

The present invention relates to electro-acoustic transducers, and more particularly, to an acoustic device used in electronic speaker box products.

DESCRIPTION OF RELATED ART

With the rapid development of wireless communication technologies, mobile phone and other consumer electronic products are widely used. Acoustic devices are also known as speakers or horns, and are often used in these products. Specifically, they are used in speaker boxes to convert audio signals into sound for playback. As customers' requirements for consumer electronic products increase, more requirements are given to acoustic devices.

In related art, the acoustic device usually includes a frame, a vibration system supported on the frame, and a magnetic circuit system having a magnetic gap. The vibration system includes a diaphragm fixed to the frame, a voice coil at least partially located in the magnetic gap, and a voice coil holder connecting the diaphragm and the voice coil. The diaphragm includes a dome.

Generally, we hope that the frequency response of the acoustic device is relatively flat. For the acoustic device product in practical application, in the high frequency stage, due to the split vibration of the dome of the diaphragm, a large drop will occur at the high frequency of the acoustic device. This will adversely affect the acoustic performance of the product.

Therefore, it is desired to provide a new acoustic device which can overcome the above problems.

SUMMARY

In view of the above, the embodiments of the present invention provide a new acoustic device. By the present invention, the acoustic device has the advantages of stable structure, simple process and low cost.

The present invention provides an acoustic device including a frame, a vibration system and a magnetic circuit system supported on the frame. The vibration system includes a diaphragm, a voice coil driving the diaphragm to generate sounds, a voice coil holder connecting the diaphragm and the voice coil, and a support assembly connecting the frame and the voice coil holder. The magnetic circuit system has a magnetic gap, and the voice coil partially locates in the magnetic gap. The voice coil holder comprises a first fixing portion extending toward a direction of the voice coil, a second fixing portion extending toward to the support assembly, and a first connecting portion connecting the first fixing portion and the second fixing portion. The first fixing portion is mounted to the voice coil, and the second fixing portion is mounted to the support assembly. The first connecting portion provides with a reinforcing rib protruding and extending from the first fixing portion.

As an improvement, the voice coil holder is a plastic voice coil holder, and the reinforcing rib is a protruding structure integrally injection-molded with the first fixing portion, the second fixing portion and the first connecting portion.

As an improvement, the voice coil holder is a metal voice coil holder, and the reinforcing rib is a protruding structure formed by stamping from the first connecting portion.

As an improvement, the reinforcing rib protrudes in a direction away from the diaphragm.

As an improvement, the magnetic circuit system comprises a yoke and a main magnet mounted on the yoke, and a plurality of auxiliary magnets around and spaced apart from the main magnet for forming the magnetic gap, and an auxiliary pole plate covered on the auxiliary magnets, and an avoiding portion is disposed on the auxiliary pole plate corresponding to a position of the reinforcing rib.

As an improvement, the acoustic device is rectangular, and the reinforcing rib is arranged along a direction of a long axis of the first connecting portion, and/or the reinforcing rib is arranged along a direction of a short axis of the first connecting portion.

As an improvement, the reinforcing ribs are symmetrically arranged on both sides of the first connecting portion.

As an improvement, the first connecting portion of the voice coil holder is a hollow annular structure, the voice coil holder further comprising a flat portion and a second connecting portion connecting the flat portion and the first connecting portion, the flat portion surrounded by the first fixing portion and the first connecting portion, the flat portion abutting against the diaphragm.

As an improvement, the first connecting portion at least partially abuts against the diaphragm.

As an improvement, the support assembly comprises a flexible circuit board mounted on a side of the voice coil holder away from the diaphragm and a support membrane mounted on a side of the flexible circuit board away from the frame, and the flexible circuit board comprises a first fixing end secured to the frame, a second fixing end secured to the voice coil holder, a third connecting portion connecting the first fixing end and the second fixing end, and a connecting arm bending and extending from the second fixing end, the voice coil comprising a leading wire, and the leading wire soldered and fixed to the connecting arm.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

Figure 1:
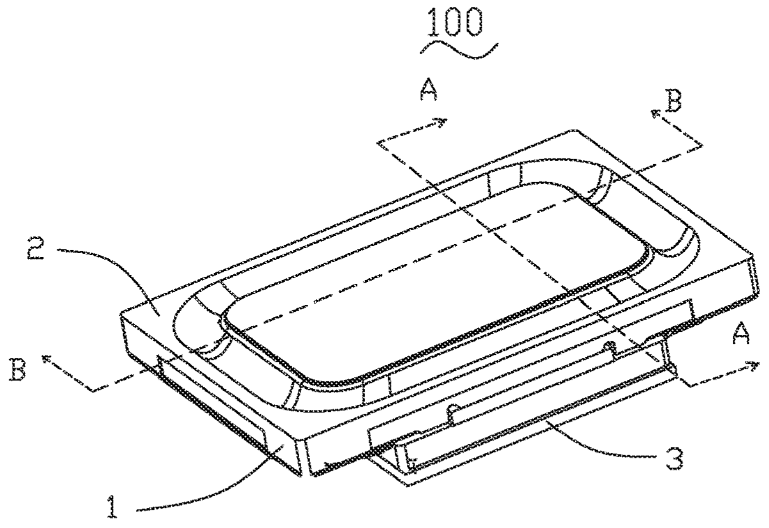
FIG. 1 is an illustrative isometric view of an acoustic device in accordance with a first embodiment of the present invention.
Figure 2:
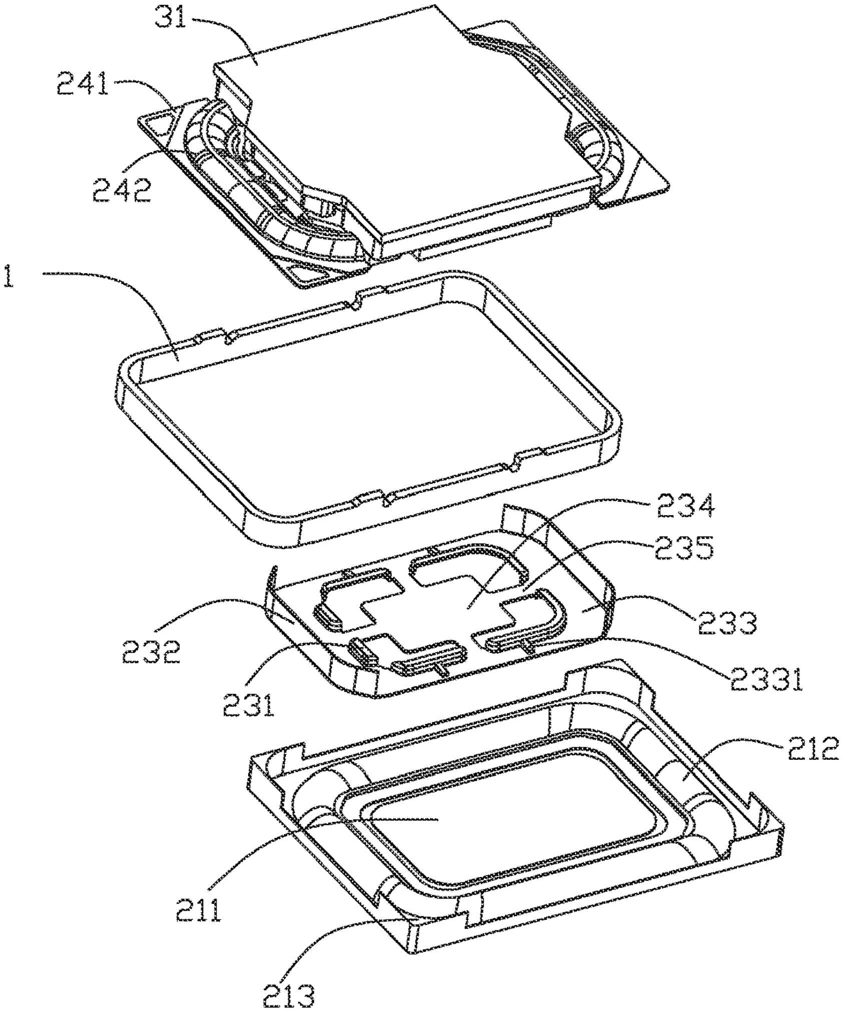
FIG. 2 is a partially exploded view of the acoustic device of FIG. 1.
Figure 3:
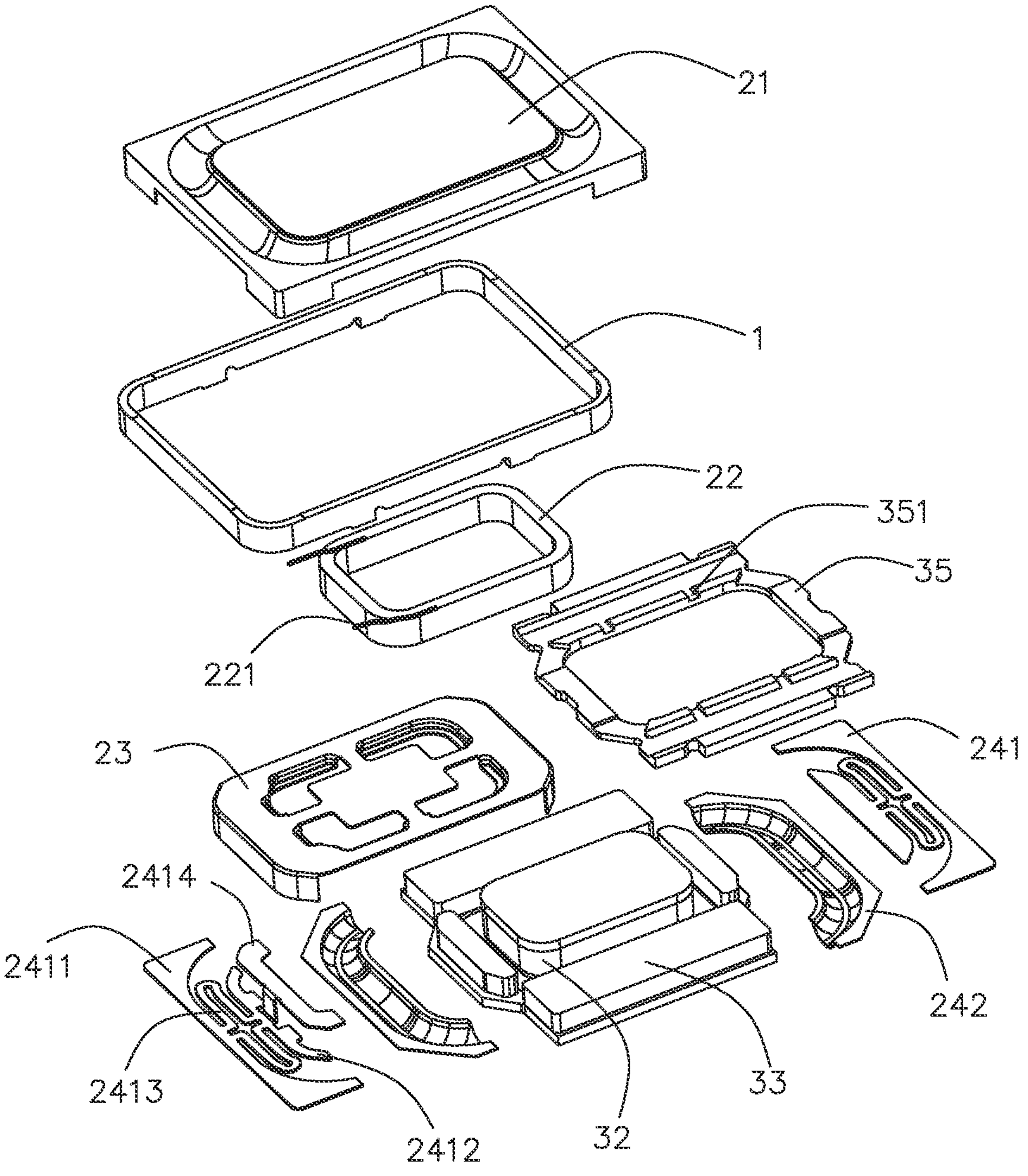
FIG. 3 is another partially exploded view of the acoustic device of FIG. 1.
Figure 4:
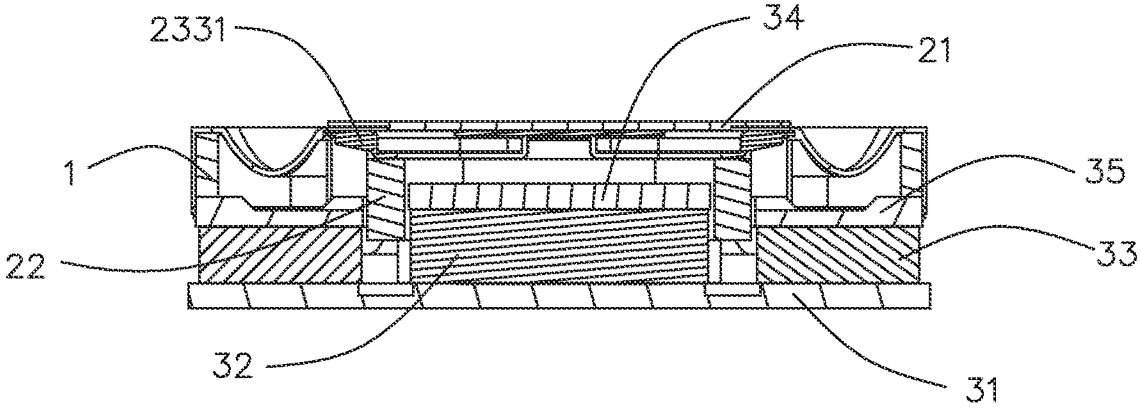
FIG. 4 is an illustrative cross-sectional view of the acoustic device taken along line A-A of FIG. 1.
Figure 5:
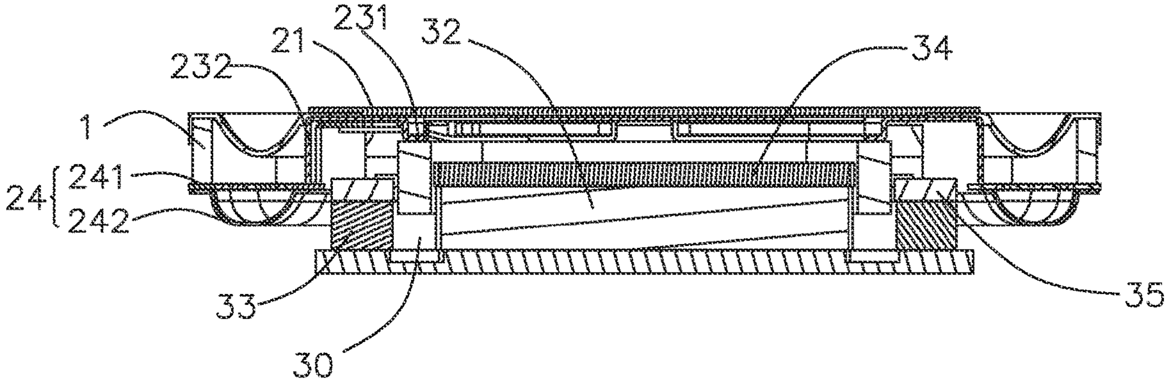
FIG. 5 is an illustrative cross-sectional view of the acoustic device taken along line B-B of FIG. 1.

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Referring to the FIGS. 1-5, the present invention provides one embodiment of an acoustic device 100. The acoustic device 100 includes a frame 1, a vibration system 2 supported on the frame 1 and a magnetic circuit system 3 having a magnetic gap 30. The vibration system 2 and the magnetic circuit system 3 are supported on the frame 1 respectively, and the magnetic circuit system 3 drives the vibration system 2 to generate sounds. The frame 1 is a rectangular annular hollow structure.

In a first embodiment of present invention, the vibration system 2 includes a diaphragm 21, a voice coil 22 at least partially located in the magnetic gap 30 to drive the diaphragm 21 to generate sounds, a voice coil holder 23 connecting the diaphragm 21 and the voice coil 22, and a support assembly 24 connecting the frame 1 and the voice coil holder 23.

The diaphragm 21 includes a dome 211, an annular suspension 212, and a plurality of mounting portions 213 each disposed at four corners of the suspension 212. The suspension 212 is disposed around the dome 211, and the mounting portions 213 are fixed to the frame 1 and arranged to cover a part of the frame 1.

The voice coil 22 includes a leading wire 221.

The voice coil holder 23 comprises a first fixing portion 231 extending toward a direction of the voice coil 22, a second fixing portion 232 extending toward to the support assembly 24, a first connecting portion 233 connecting the first fixing portion 231 and the second fixing portion 232, a flat portion 234 surrounded by the first fixing portion 231 and the first connecting portion 233, and a second connecting portion 235 connecting the flat portion 234 and the first connecting portion 233. The first fixing portion 231 is mounted to the voice coil 22, and the second fixing portion 232 is mounted to the support assembly 24. The first connecting portion 233 is a hollow annular structure. The flat portion 234 abuts against the diaphragm 21.

The first connecting portion 233 provides with a reinforcing rib 2331 protruding and extending from the first fixing portion 231. The reinforcing rib 2331 protrudes in a direction away from the diaphragm 21. There is a plurality of reinforcing ribs 2331, and adjacent reinforcing ribs 2331 are spaced apart from each other. The flat portion 234 of the voice coil holder 23 is attached to a side of the dome 221 proximal to the voice coil 22. The first fixing portion 231 of the voice coil holder 23 bends and extends from an inner end of the first connecting portion 233 to a direction away from the diaphragm 21. The second fixing portion 232 bends and extends from an outer end of the first connecting portion 233 to a direction away from the diaphragm 21. The first fixing portion 231 and the second fixing portion 232 are disposed opposite to and spaced apart from each other. The first fixing portion 231 extends toward the voice coil 22 and is fixedly connected to an end of the voice coil 22 close to the diaphragm 21, and the second fixing portion 232 extends toward the support assembly 24 and is fixedly connected to the support assembly 24. At least a part of the first connecting portion 233 abuts against and supports the diaphragm 21.

In present embodiment, the voice coil holder 23 is a plastic voice coil holder, and the reinforcing rib 2331 is a protruding structure integrally injection-molded with the first fixing portion 231, the second fixing portion 232 and the first connecting portion 233. And in other embodiments, the reinforcing rib 2331 can also be a thicker part formed during the molding process. At this time, there is no obvious protrusion shape, but a thickness of the first connecting portion with the reinforcing rib is greater than that of the other parts without the reinforcing rib.

The acoustic device 100 can be with a rectangular shape, and the reinforcing rib 2331 is arranged along a direction of a long axis of the first connecting portion 233, and/or the reinforcing rib 2331 is arranged along a direction of a short axis of the first connecting portion 233. Optionally, the reinforcing ribs 2331 are symmetrically arranged on both sides of the first connecting portion 233.

The support assembly 24 comprises a flexible circuit board 241 mounted on a side of the voice coil holder 23 away from the diaphragm 21 and a support membrane 242 mounted on a side of the flexible circuit board 241 away from the frame 1. The flexible circuit board 241 comprises a first fixing end 2411 secured to the frame 1, a second fixing end 2412 secured to the voice coil holder 23, a third connecting portion 2413 connecting the first fixing end 2411 and the second fixing end 2412, and a connecting arm 2414 bending and extending from the second fixing end 2412. The leading wire 221 is soldered and fixed to the connecting arm 2414. The second fixing end 2412 is fixedly connected with the second fixing portion 232. The number of the support membranes 242 is two, and each of the two short axis directions of the acoustic device 100 is arranged with one support membrane 242. The number of the flexible circuit boards 241 is also two. And each of the two short axis directions of the acoustic device 100 is arranged with one flexible circuit board 241. And only one of the flexible circuit boards 241 is provided with the connecting arm 2414.

The magnetic circuit system 3 comprises a yoke 31 and a main magnet 32 mounted on the yoke 31, and a plurality of auxiliary magnets 33 around and spaced apart from the main magnet 32 for forming the magnetic gap 30, a main pole plate 34 covered on the main magnet 32, and an auxiliary pole plate 35 covered on the auxiliary magnets 33. The number of the auxiliary magnets 33 is four, and the four auxiliary magnets 33 are arranged around the main magnet 32, and an avoiding portion 351 is disposed on the auxiliary pole plate 35 corresponding to a position of the reinforcing rib 2331.

Figure 6:
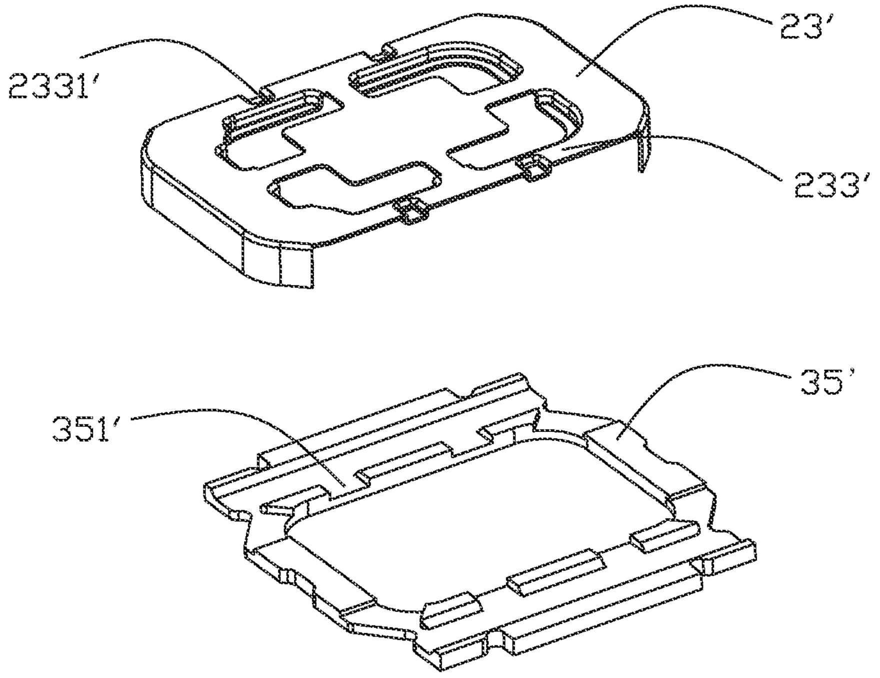
FIG. 6 is an illustrative isometric view of a voice coil holder and an auxiliary pole plate of an acoustic device in accordance with a second embodiment of the present invention.

Referring to the FIG. 6, a second embodiment of present invention, and the only difference between the second embodiment and the first embodiment is that the voice coil holder 23' in the second embodiment is a metal voice coil holder, and the reinforcing rib 2331' is a protruding structure formed by stamping from the first connecting portion 231'. The auxiliary pole plate 35' is also provided with a corresponding avoiding portion 351'.

Comparing with the related art, in present invention, the acoustic device includes a frame, a vibration system and a magnetic circuit system supported on the frame. The vibration system includes a diaphragm, a voice coil driving the diaphragm to generate sounds, a voice coil holder connecting the diaphragm and the voice coil, and a support assembly connecting the frame and the voice coil holder. The magnetic circuit system has a magnetic gap, and the voice coil partially locates in the magnetic gap. The voice coil holder comprises a first fixing portion extending toward a direction of the voice coil, a second fixing portion extending toward to the support assembly, and a first connecting portion connecting the first fixing portion and the second fixing portion. The first fixing portion is mounted to the voice coil, and the second fixing portion is mounted to the support assembly. The first connecting portion provides with a reinforcing rib protruding and extending from the first fixing portion. Therefore, by disposing reinforcing ribs on the first connecting portion of the voice coil holder, it is beneficial to enhance a rigidity of the voice coil holder. And to a certain extent, an influence of split vibration on performance can be improved. A natural frequency can be increased by more than 10%. A high frequency of the acoustic device is extended, thereby improving a high frequency performance of the acoustic device.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An acoustic device, comprising:
- a frame;
- a vibration system supported on the frame, the vibration system comprising:
  - a diaphragm;
  - a voice coil driving the diaphragm to generate sounds;
  - a voice coil holder connecting the diaphragm and the voice coil; and
  - a support assembly connecting the frame and the voice coil holder;
- a magnetic circuit system supported on the frame and having a magnetic gap, the voice coil partially located in the magnetic gap;
- wherein the voice coil holder comprises a first fixing portion extending toward a direction of the voice coil, a second fixing portion extending toward to the support assembly, and a first connecting portion connecting the first fixing portion and the second fixing portion, the first fixing portion mounted to the voice coil, the second fixing portion mounted to the support assembly, the first connecting portion providing with a reinforcing rib protruding and extending from the first fixing portion.

2. The acoustic device as described in claim 1, wherein the voice coil holder is a plastic voice coil holder, and the reinforcing rib is a protruding structure integrally injection-molded with the first fixing portion, the second fixing portion and the first connecting portion.

3. The acoustic device as described in claim 1, wherein the voice coil holder is a metal voice coil holder, and the reinforcing rib is a protruding structure formed by stamping from the first connecting portion.

4. The acoustic device as described in claim 1, wherein the reinforcing rib protrudes in a direction away from the diaphragm.

5. The acoustic device as described in claim 4, wherein the magnetic circuit system comprises a yoke and a main magnet mounted on the yoke, a plurality of auxiliary magnets around and spaced apart from the main magnet for forming the magnetic gap, and an auxiliary pole plate covered on the auxiliary magnets, and an avoiding portion is disposed on the auxiliary pole plate corresponding to a position of the reinforcing rib.

6. The acoustic device as described in claim 1, wherein the acoustic device is rectangular, and the reinforcing rib is arranged along a direction of a long axis of the first connecting portion, and/or the reinforcing rib is arranged along a direction of a short axis of the first connecting portion.

7. The acoustic device as described in claim 1, wherein the reinforcing ribs are symmetrically arranged on both sides of the first connecting portion.

8. The acoustic device as described in claim 1, wherein the first connecting portion of the voice coil holder is a hollow annular structure, the voice coil holder further comprising a flat portion and a second connecting portion connecting the flat portion and the first connecting portion, the flat portion surrounded by the first fixing portion and the first connecting portion, the flat portion abutting against the diaphragm.

9. The acoustic device as described in claim 1, wherein the first connecting portion at least partially abuts against the diaphragm.

10. The acoustic device as described in claim 1, wherein the support assembly comprises a flexible circuit board mounted on a side of the voice coil holder away from the diaphragm and a support membrane mounted on a side of the flexible circuit board away from the frame, and the flexible circuit board comprises a first fixing end secured to the frame, a second fixing end secured to the voice coil holder, a third connecting portion connecting the first fixing end and the second fixing end, and a connecting arm bending and extending from the second fixing end, the voice coil comprising a leading wire, and the leading wire soldered and fixed to the connecting arm.

* * * * *